United States Patent [19]

LeFever

[11] Patent Number: 4,599,732

[45] Date of Patent: Jul. 8, 1986

[54] TECHNIQUE FOR ACQUIRING TIMING AND FREQUENCY SYNCHRONIZATION FOR MODEM UTILIZING KNOWN (NON-DATA) SYMBOLS AS PART OF THEIR NORMAL TRANSMITTED DATA FORMAT

[75] Inventor: Ronald S. LeFever, Satellite Beach, Fla.

[73] Assignee: Harris Corporation, Melbourne, Fla.

[21] Appl. No.: 601,320

[22] Filed: Apr. 17, 1984

[51] Int. Cl.$^4$ ........................................... H04L 25/08
[52] U.S. Cl. ..................................... 375/13; 375/101; 375/112; 375/115
[58] Field of Search ...................... 375/13, 58, 97, 101, 375/103, 115, 116, 112, 98; 364/728, 724; 455/63, 257, 265, 311, 312; 343/5 PN, 378; 333/18; 371/37, 43, 47; 370/112

[56] References Cited

U.S. PATENT DOCUMENTS

| | | | |
|---|---|---|---|
| 3,935,535 | 1/1976 | Motley et al. | 375/13 |
| 4,009,356 | 2/1977 | Borysiewicz et al. | 375/13 |
| 4,112,496 | 9/1978 | Stevens | 343/378 |
| 4,208,650 | 6/1980 | Horn | 371/49 |
| 4,320,517 | 3/1982 | Godard et al. | 375/13 |
| 4,398,062 | 8/1983 | McRae et al. | 375/13 |
| 4,433,425 | 2/1984 | Jaeger | 375/13 |
| 4,435,826 | 3/1984 | Matsui | 375/115 |
| 4,514,855 | 4/1985 | Lang et al. | 375/97 |

Primary Examiner—Benedict V. Safourek
Attorney, Agent, or Firm—Antonelli, Terry & Wands

[57] ABSTRACT

A signal processing scheme through which the receiver may, at any time, synchronize or resynchronize itself to the transmitted data signals that are received over a dynamic dispersive channel. At the transmitter, bursts or sequences of known symbols are interleaved with unknown data. At the receiver incoming frames of signals (containing interleaved bursts of known data and unknown data) are processed in a manner similar to the processing of spread spectrum encoded data. A replica (or respective replicas) of the known signal burst(s) is (complex) correlated with the incoming signal to locate and lock onto a known (PN) reference symbol burst. Once a known symbol block has been located, a symbol rate clock (bit sync) is adjusted to track out any offset in the timing used for sampling the received data. This is followed by coarse and fine frequency offset adjustments to enable the local oscillator to lock onto the transmitted frequency.

58 Claims, 8 Drawing Figures

TECHNIQUE FOR ACQUIRING TIMING AND FREQUENCY SYNCHRONIZATION FOR MODEM UTILIZING KNOWN (NON-DATA) SYMBOLS AS PART OF THEIR NORMAL TRANSMITTED DATA FORMAT

FIELD OF THE INVENTION

The present invention relates in general to communication systems, and is particularly directed to a scheme for acquiring timing and frequency synchronization in a modem employing an adaptive equalizer, without requiring the message source to transmit a synchronization preamble.

BACKGROUND OF THE INVENTION

There are a number of communication links, such as HF transmission paths and disturbed satellite communication links, that may introduce distortion or contamination into messages transmitted over the link and thereby make it difficult to faithfully reproduce the original message at the receiver. This distortion (including loss of signal) may be the result of any number of effects, such as multi-path reception, group delay distortion, noise amplitude interference, dispersive fading or, in general, a smearing or time-spread of the time response of the communication link. Because of these adverse influences, the data received is seldom the same as the original message, so that some form of anti-distortion compensation must be employed in the receiver's signal processing equipment.

Such anti-distortion compensation typically involves the use of an adaptive equalizer (such as a decision feedback equalizer) through which the distortion-introducing characteristics of the channel are estimated and through which the received signal is modified to compensate for the distortion of the channel. Because the characteristics of the channel are dynamic, it is necessary to continually update the settings (e.g. weighting coefficients) of the equalizer. For this purpose, it has been found that by interspersing blocks of known symbols within the data message being transmitted, the equalizer may continually compare the known data bursts in the received signal with a stored replica and adjust itself to correct for differences in the stored replica and received bursts, so that it is able to avoid drifting due to large bursts of error (such as severe time-varying intersymbol interference introduced by the channel) and/or signal fading. This technique is described in U.S. Pat. No. 4,365,338 to D. D. McRae et al entitled "Technique for High Rate Digital Transmission Over a Dynamic Dispersive Channel", issued Dec. 21, 1982 and assigned to the Assignee of the present application, and reference may be had to that patent for a detailed description of such a signal formatting and processing scheme.

As is described in the above-referenced patent and as is commonly employed in signal recovery systems employing an equalizer as part of the signal correction process, in order for the equalizer to adapt itself to the incoming signal, it is necessary for the receiver to lock-onto the carrier and align itself with the symbol rate of the incoming data. This is typically achieved through the use of a synchronization preamble, such as a prescribed tone transmitted for a preselected time interval followed by a phase reversal of the tone. Through this sync preamble the carrier recovery loop and symbol rate clock are able to lock onto the incoming signal and provide timing control for the equalizer, so that it may proceed to carry out its own task of compensation which requires that the replica of a known symbol burst (e.g. a PN code) be synchronized with the known data (PN code) in the received signal upon which the equalizer operates. While the sync preamble enables the receiver to achieve synchronization between the transmitted and reference known data bursts, in order for the receiver to recover from a severe and/or extended signal fade, the sync preamble often must be retransmitted, thereby reducing available bandwidth.

SUMMARY OF THE INVENTION

In accordance with the present invention, the need for the transmission or retransmission of a synchronization preamble for successful operation of a modem's equalizer is obviated by a signal processing scheme through which the receiver may, at any time, synchronize or resynchronize itself to the transmitted data signals that are received over a dynamic dispersive channel, by a technique that takes advantage of the inclusion of the known symbol bursts interleaved with unknown data, such as are employed in the system described in the above-referenced patent. Briefly, this scheme entails processing the incoming signals (containing interleaved bursts of known (e.g. PN sequences) data and unknown data) in a manner similar to the processing of spread spectrum encoded data. A replica (or respective replicas) of the known signal burst(s) is (complex) correlated with the incoming signal to locate and lock onto a known (PN) reference symbol burst. Once a known symbol block has been located, a symbol rate clock (bit sync) is adjusted to track out any offset in the timing used for sampling the received data, followed by coarse and fine frequency offset adjustments to enable the local oscillator to lock onto the transmitted frequency.

DETAILED DESCRIPTION

Figure 1:
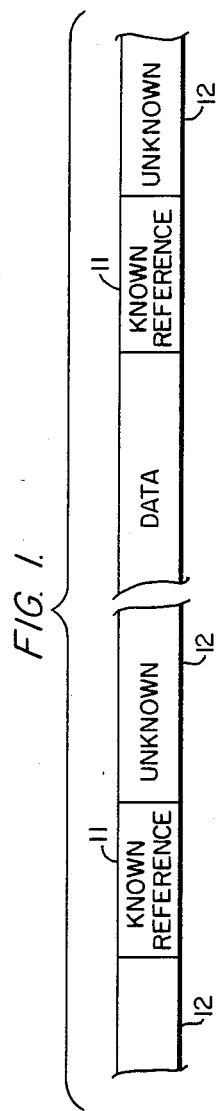
FIG. 1 is a timing diagram of the format of frames of symbols transmitted and processed in accordance with the principles of the present invention.

Before describing, in detail, the particular improved timing and frequency synchronization scheme in accordance with the present invention, it should be observed that the invention resides primarily in a novel combination of conventional signal recovery hardware (e.g. receiver, filters, etc.) and intercoupled processor subsystem, which carry out timing and frequency acquisition and synchronization tasks on recovered signal-representation values obtained from the receiver hardware. Accordingly, the structure, control and arrangement of such components have been illustrated in the schematic diagrams of the drawings by readily understandable block representations which show only those specific details that are pertinent to the present invention, in order not to obscure the disclosure with structural details which will be readily apparent to those skilled in the art having the benefit of the description herein. In addition, illustration of the signal processing equipment has been appropriately consolidated into units dedicated to specific signal processing tasks, e.g. correlation equalizer, correlation detector, control processor and timing generator, the details of which are described below, in order to emphasize those portions that are most pertinent to an understanding of the present invention. Thus, the block diagram illustrations of the drawings do not necessarily represent the mechanical structure arrangement of an exemplary timing and frequency synchronization system, but are primarily intended to depict the major equipment components of the system in a convenient functional grouping, whereby the present invention may be more readily understood.

Prior to describing the signal recovery and processing equipment of which the present invention is comprised, it is useful to examine the format of the signal that has been transmitted over a communication link of interest, such as an HF channel or satellite link, and which is to be received and coherently demodulated in the receiver. Such a signal preferably consists of blocks of known reference symbols (e.g. some defined PN sequence or respective sets of PN sequences) interleaved with unknown data. As pointed out briefly above, with reference to the D. D. McRae et al, U.S. Pat. No. 4,365,338, by interspersing, at the transmitter, blocks of known reference symbols with the unknown data, then, at the receiver, the equalizer is able to be dynamically updated on a continual basis, by correlating the received signals with its own copy of the known reference signals. In the above-referenced patented system, these interleaved blocks of unknown data and known reference symbols are preceded by a synchronization preamble which the modem employs to achieve frequency and timing synchronization. In accordance with the present invention, however, such a preamble is unnecessary, as the signal recovery and processing scheme achieves frequency and timing synchronization exclusively through the use of the blocks of known reference symbols that are employed for dynamically updating the characteristics of the modem's equalizer.

Referring now to FIG. 1, an example of the above-referenced signal format is shown as containing blocks 11 of known reference symbols (such as a prescribed finite-length PN sequence) interleaved with blocks 12 of unknown data symbols. For purposes of presenting an exemplary embodiment of the invention, for a data rate of 2.56 Mb/s (BPSK), a block of eighty-six known reference symbols 11 may be interleaved with blocks 12 of 1194 unknown data symbols for a total symbol span of 1280 symbols (known plus unknown) per frame. It should be observed, however, that the invention is not limited to this or any other ratio of known-to-unknown symbols or limited to BPSK modulation. For signal processing and data recovery purposes the incoming data is sampled twice per symbol, so that each frame of received data may be considered to contain 2560 symbol samples (comprised of a block of 172 known symbol samples and a block of 2388 unknown symbol samples).

As described in the above-referenced patent, because of the insertion or interleaving of blocks of known symbols among successive blocks of unknown symbols, the equalizer in the receiver has available to it a signal mechanism that enables it to continually (dynamically) update its weighting coefficients and thereby compensate for the distortion introducing effects of the communication channel of interest. For the purpose of the present example it will be assumed that the maximum time-smearing effect of the channel to be compensated for is ten symbols wide. Thus the span of the equalizer should be wide enough to encompass this span without spillover. For a sample rate of two samples per symbol, the span of the equalizer may be twenty samples wide. The manner in which the signal processing subsystem portion of the receiver equipment of the present invention locates the interleaved blocks of known reference symbols and enables the equalizer to be dynamically updated thereby will be described below in conjunction with the description of the operation of FIG. 2.

Figure 2:
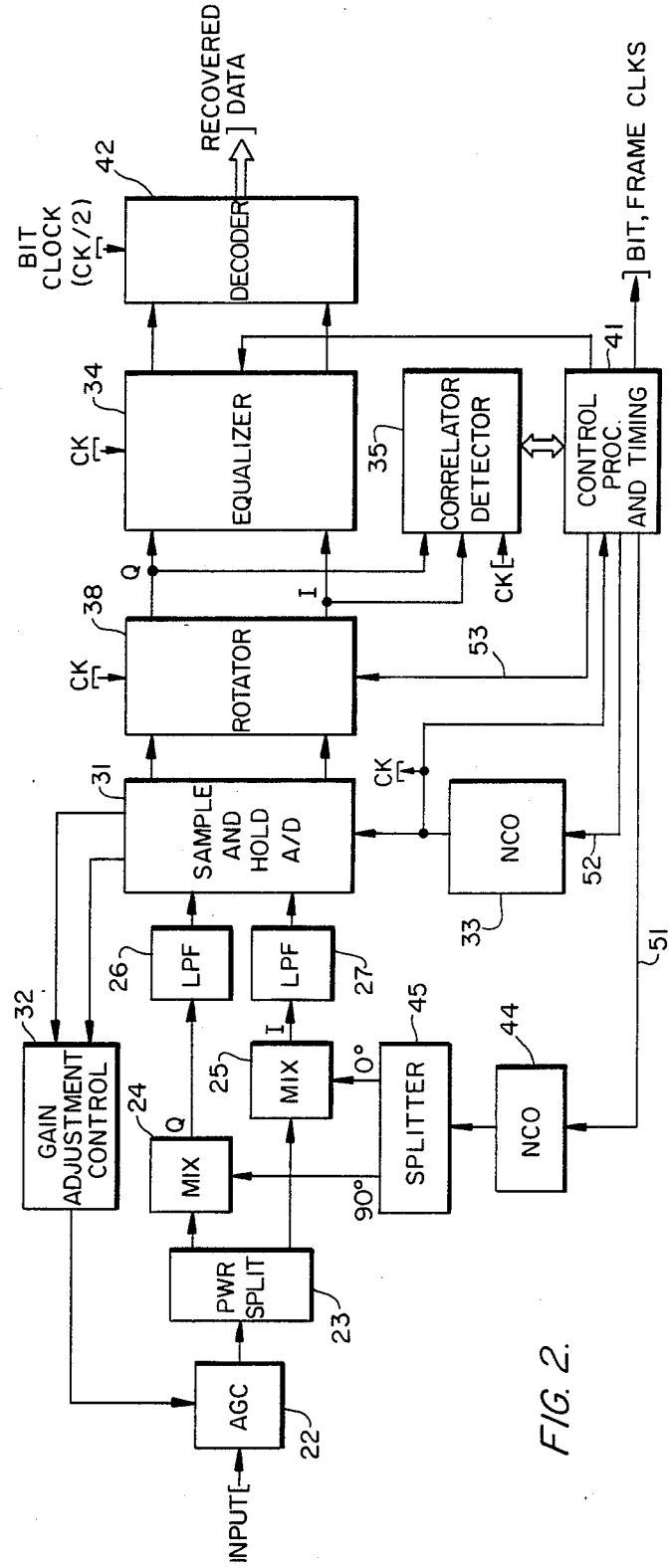
FIG. 2 is a schematic block diagram of receiver employing a timing and frequency synchronization scheme according to the present invention.

Referring now to FIG. 2, there is shown a schematic block diagram of a receiver employing a frequency and timing synchronization scheme in accordance with the present invention. Incoming IF signals containing successive frames of data encoded in the manner shown in FIG. 1 are coupled over link 21 through an AGC circuit 22 to a power splitter 23. AGC circuit 22 is controlled by the output of a gain adjustment control 32 which responds to the average amplitude of the baseband in-phase (I) and quadrature-phase (Q) signals extracted from the incoming baseband signal, as supplied by a sample and hold, A-D converter 31 and adjusts the amplitude of the incoming IF signal in accordance with the output of gain adjustment control 32. Baseband conversion to the I and Q components is carried out by a pair of mixers 24 and 25 which receive the analog IF signal from power splitter 23 and multiply the IF signal by quadrature outputs of splitter 45 which receives the output of a numerically (digitally) controlled oscillator (NCO) 44 operating nominally at the IF carrier frequency. Oscillator 44 is driven by a clock control signal supplied over link 51 from a control processor unit 41. As will be described in detail below, processor 41 supplies digital control signals over links 51 and 52 based upon information received from a known symbol sequence correlator 35 so as to control bit synchronization clock 33 as well as coarse and fine frequency tuning of oscillator 44.

In terms of original signal acquisition, oscillator 44 is preferably stepped through successive frequency sub-bands or bins with the sequence of synchronization steps to be described below carried out for each bin until signal has been acquired. Then, within that frequency bin, bit synchronization followed by coarse and fine frequency tuning of oscillator 44 are carried out. For purposes of the present description it will be assumed that the frequency of a signal of interest lies in the frequency bin currently being scanned by oscillator 44.

As described above, the I and Q analog baseband signals output by mixers 24 and 25 are coupled to A-D converter circuit 31 through respective low pass filters 26 and 27. A-D converter 31 samples the I and Q baseband signals as a function of the bit rate of the digital data contained in the received signal under the control of a bit rate clock signal generated by a second NCO 33 in response to the control signal 52 as supplied by processor 41. As pointed out above, this clock causes converter 31 to sample the incoming signals twice per symbol. A-D converter 31 quantizes the baseband analog levels of the signal samples to the desired accuracy (e.g. 8 bits) and supplies the resulting digital code to gain adjustment control 32, which adjusts the level of AGC circuit 22 to maintain the sampled signal at an appropriate amplitude. The digital signal values are also supplied by A-D converter 31 to the data conditioning section (phase rotator 38, equalizer 34 and correlator 35).

Phase rotator 38 (which is an optimal aid to the equalizer but is not necessary for acquisition) is comprised of a controlled logic circuit that responds to control signals on line 53 from processor 41 and performs a two dimensional rotation of (maps) the I and Q channel samples derived from A-D converter 31 in accordance with the expression:

$$I+jQ = (I\sim + jQ\sim)(\cos\theta + j\sin\theta) \quad (1)$$

or, equivalently, $$I = I\sim \cos\theta - Q\sim \sin\theta, \quad Q = Q\sim \cos\theta + I\sim \sin\theta, \quad (2)$$

wherein $\sin\theta$ and $\cos\theta$ representative values are coupled from processor 41 over link 53, so that phase rotator 38 may perform instantaneous phase corrections with advancing frequency as will be described below.

Figure 3:
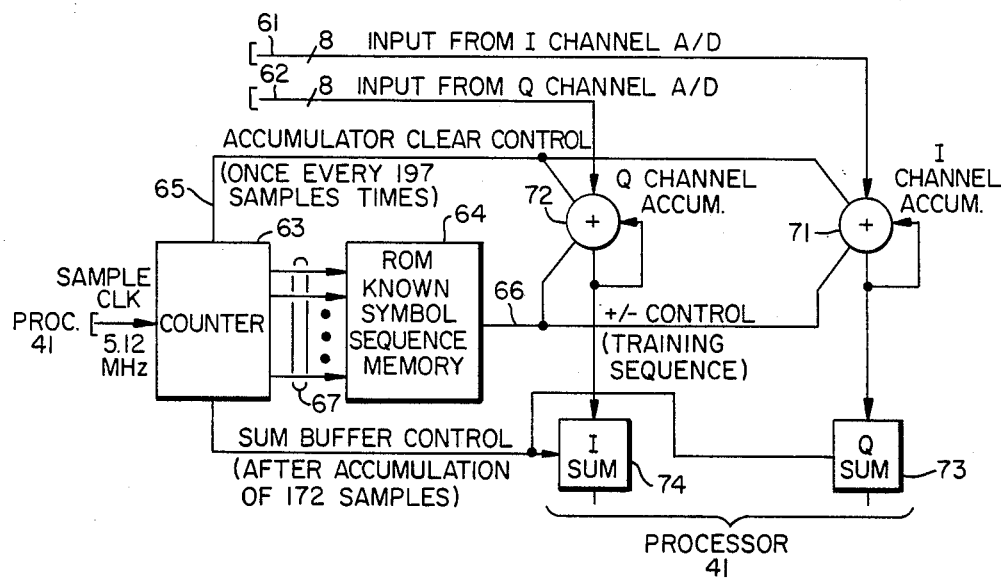
FIG. 3 is a schematic block diagram of one stage of correlation detector employed in the receiver of FIG. 2.

The phase-corrected I and Q digital code values output by phase rotator 38 are coupled to equalizer 34 and a known symbol sequence correlator 35, to be described in greater detail below in conjunction with the description of of FIG. 3. As the details of equalizer 34 are not necessary for an understanding of the present invention, they will not be described here. Suffice it to say that in the exemplary embodiment shown and described here, equalizer 34 is adaptive (such as a decision feedback equalizer) using the contents of the blocks of known reference symbols 11 (FIG. 1) to update the weighting coefficient values for its successive stages of symbol correction. For purposes of the present description equalizer 34 may correspond to the equalizer scheme described in the above-referenced patent and, as described previously, may be assumed to cover a span of twenty symbol samples. The corrected I and Q values produced by equalizer 34 are coupled to a downstream data decision circuit 42 for recovery of the original data.

As pointed out above, the phase-corrected I and Q codes supplied by phase rotator 38 are coupled to a known reference symbol sequence correlator 35. Known reference symbol sequence correlator 35 (shown in detail in FIG. 3, to be described below) executes a (complex) cross-correlation between a sequence of known reference symbols (corresponding to those contained in originally transmitted signal blocks 11 (FIG. 1)) and the received signals on both the I and Q channels and supplies therefrom frequency, timing and phase information to processor 41, so that the processor, in turn, may supply the required control signals on links 51, 52 and 53 to oscillators 44 and 33 and phase rotator 32, respectively.

As mentioned previously, a significant aspect of the present invention, as contrasted with prior art approaches of achieving frequency and timing synchronization through the use of a sync preamble or header that must be transmitted prior to commencing the sending of actual data, is the use of the interleaved blocks of known symbols (which are employed for adaptive equalization) to achieve acquisition of timing and frequency synchronization, and also frequency and phase tracking, so that no sync preamble is required. This permits the receiver to be effectively put into operation simply by turning the receiver on, rather than first having to request a sync preamble transmission from the transmitter (thereby interrupting the data source), a task that is also required for extended loss of signal as in the case of severe fading.

A conventional scheme operating over non-dispersive channels would typically use the following acquisition and timing recovery scenario. First, carrier frequency and phase lock are acquired through a front end tracking loop such as a Costas loop. (Any of the conventional loops used for this purpose will, however, be almost totally inoperative under the severe intersymbol interference encountered in highly dispersive channels.) Next, locking onto the symbol rate (bit sync lock) is carried out through the use of one of several types of conventional bit synchronization loops. (This also is not possible on dispersive channels since each symbol is dispersed over several symbol intervals.) Finally the I and Q output bit decisions (no adaptive equalizer is used) are scanned to locate frame synchronization bits.

Such a conventional scheme operating over high dispersive channels would typically perform acquisition and timing recovery in the same sequential order, however, through the use of a synchronization preamble as follows.

First, the carrier frequency (and often phase) are acquired. This may be accomplished through the transmission of a prescribed tone as the initial portion of the synchronization preamble. Next, locking onto the symbol rate (bit sync lock) is carried out. This may be achieved through the use of second phase of the synchronization preamble such as an alternating one-zero (1010 . . . ) pattern or by employing extremely stable oscillators in both the transmitter and receiver to establish symbol timing. Finally, locking onto the reference symbol (PN) sequence is achieved by monitoring the synchronization preamble (tone or alternating one-zero pattern) and initiating the operation of the known symbol generator upon detecting phase reversal (frame timing marker) in the prescribed tone or symbol pattern.

The present invention, on the other hand, executes these synchronization steps in just the reverse order and, advantageously, without the need for the sync preamble. Namely, first the location (in the received signal) of the known symbol sequence is determined by cross-correlating (in known symbol sequence correlator detector 35) the received signal with a stored replica of the known reference symbol sequence. Once an acceptable correlation value has been detected to locate the known symbol sequence, symbol rate clock 33 is adjusted until the correlation peak location is effectively stabilized. Finally, with the periodically inserted reference symbol sequence accurately located (frame sync) and symbol rate clock stabilized (bit sync), coarse and fine frequency adjustment procedures are executed by processor 41 to bring the output of oscillator 44 to within a prescribed tolerance of the transmitted frequency. The operation of the equalizer 34 can now be effective. This sequence of operations and the processing steps carried out by processor 41 to achieve these operations will be described in detail below.

Known Symbol Sequence Synchronization (Frame Sync).

As explained briefly above, the initial task of the receiver is to locate the blocks of known reference symbols that are interleaved with the unknown reference symbols in the successive frames of symbols. This operation is performed by a known symbol sequence correlation detector 35, which performs a (complex) cross-correlation of the received I and Q baseband signal (digital values) with a stored replica of the block of known symbols (digital values) that is interleaved with blocks of unknown data in successive frames. For this purpose, known symbol sequence detector 35 may be configured in the manner shown in FIG. 3. As shown therein the I and Q output words from phase rotator 32 are coupled over links 61 and 62, respectively, to a pair of accumulator stages 71 and 72. Each accumulator stage may be comprised of a series-connected binary arithmetic logic unit (ALU) and storage register to which are applied respective received symbol values for the I and Q channels and a reference symbol value coupled over link 66 from a look-up table ROM 64 under the control of a counter 63 to control either the adding or subtracting of successive received values to the accumulated sum in the storage register. It should be noted that for other than BPSK modulation this complex correlation requires additional hardware such as 4 (rather than 2) accumulation stages for QPSK and 4 multiply-accumulator stages for any other modulation format (8-ary PSK for example).

Counter 63 is sequentially incremented by control processor 41 at the sample clock rate (e.g. 5.12 MHz) so as to generate a sequence of successive address codes coupled over link 67 for accessing the contents of ROM 64. ROM 64 contains, in 172 successive memory locations, digital values corresponding to the successive ones and zeroes of a PN sequence to be correlated with the received symbol samples through the action of accumulators 71 and 72. The contents of accumulators 71 and 72 are periodically coupled to respective buffer registers 73 and 74 (every 172 sample clock pulses). The contents of buffer register 73 and 74 are readout and coupled to processor 41 wherein they are squared, the square values summed, and the resulting sum compared with a threshold. If the threshold is exceeded a correlation peak is identified and thereby the location of the known symbol sequence within the frame is detected.

In carrying out its task of detecting the location of the known reference symbol sequence within a received frame of data, detector 35 operates on successive portions of the received symbols in a manner to be described below with reference to FIG. 4 which diagrammatically illustrates the symbol/timing relationship among successive frames of received symbols and the blocks of known reference symbols correlated therewith by correlator detector 35.

Figure 4:
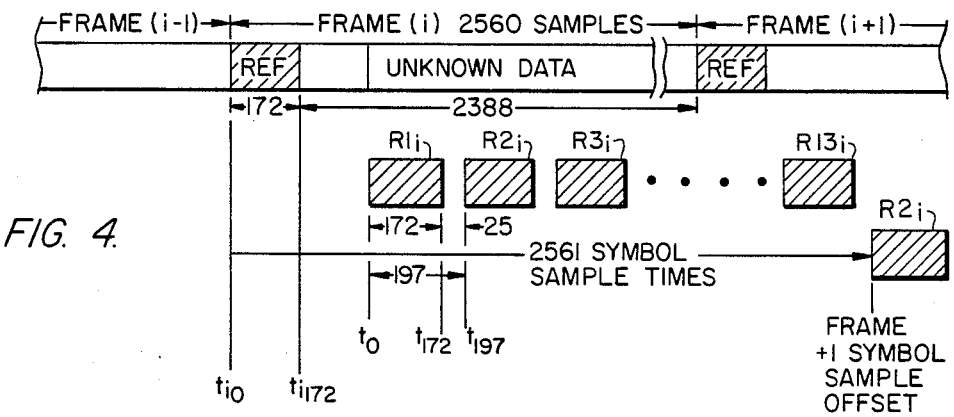
FIG. 4 shows the symbol/timing relationships in the correlation operation of correlation detector of FIG. 3 for successive frames of symbols.

More particularly, FIG. 4 (in a manner similar to FIG. 1) shows a sequence of frames symbol samples (frame $(i-1)$, frame (i), frame $(i+1)$) as they are received and coupled out of A-D converter 31. As described above each frame is comprised of a block of 172 reference symbol samples (at the beginning of each frame) followed by a block of 2388 unknown symbol samples making up the remainder of the frame. If the receiver were perfectly synchronized with the incoming frames of symbols, the known reference symbol sequence generated thereby would be time-aligned with the known reference symbol block in each frame, shown in FIG. 4 as beginning at time $t_i$ for frame (i) and continuing for 172 symbol samples to time $t_{i+172}$. When correlation detector 35 is placed into operation, however, the beginning of the generation of a known reference symbol sequence will commence at a time that is not necessarily synchronized with time $t_i$, $t_{(i+1)}$ etc., (i.e. at the beginning of any frame), but rather at some arbitrary time $t_o$, shown in FIG. 4 as occurring within that portion of frame (i) during which unknown data samples are being received. Yet, by carrying out a process of successive correlations, correlation detector 35 is able to locate the known reference sequence and thereby achieve frame lock, as will be described below.

When detector 35 is initialized, counter 63 and accumulators 71 and 72 are cleared. Using the timing diagram of FIG. 4, this initializing action commences at time $t_o$. During the next successive 171 clock pulses from processor 41, counter 63 is incremented and the known reference symbol samples sequence accessed thereby and represented in FIG. 4 as sequence R1 is correlated with those 172 symbols samples in frame $F_i$ that are output by A-D converter 31 beginning at time $t_0$, and the results accumulated in I and Q channel accumulators 71 and 72. For the example shown in FIG. 4, since PN sequence R1 is not aligned with the known reference sequence $R_i$ in frame f(i), but is rather aligned with an arbitrary unknown data block portion $D_i$, a correlation between the data symbol samples $D_i$ and PN sequence R1 will contain insufficient energy to be identified as the location of the known reference sequence. The coupling of the contents of accumulators 71 and 72 via buffer register 73 and 74 to processor 41 for correlation peak detection takes place subsequent to the clocking of the 172nd sample value out of ROM 64. To provide a sufficient signal processing time window for this purpose a processing interval of 25 symbol samples from sample time $t_{172}$ to sample time $t_{197}$ may be provided. Thus a correlation processing subframe occurs over an interval of 197 samples. This numerical value has been chosen simply for purposes of convenience and mathematical efficiency in terms of the sample span of a frame. It is noted that an integral number (here 13) times the number of processing subframes covers 2561 samples. Therefore, for each successive frame $(i+1)$, $(i+2)$ . . . there will be an iteration in the time of commencement of the first correlation block by detector 35 of precisely one sample time. Thus, after 197 frames everyone of the 2560 sample positions will have been checked for correlation with the known reference symbol sequence. This means that, for the present example, in a worst case situation, the time required for correlation detector 35 to locate the known reference symbol sequence will be 197 frames, or 197 frames×2560 samples/frame÷5.12 samples/sec=98.5 milliseconds.

Upon correlation detector 35 locating the known reference symbol block, the control timing provided by processor 41 is effectively caused to generate a master reset for the various receiver elements so that the equalizer 34 may begin to train up at that time using the known reference symbol block in the received frame, now synchronized with the reference sequence generated in the receiver.

SYMBOL RATE CLOCK SYNCHRONIZATION (BIT SYNC)

As mentioned previously, the characteristics of the channel of interest are considered to be time dispersive (here over a prescribed symbol span of 10 symbols) so that even though frame synchronization has been acquired correlation for timing offsets must be effected. This is carried out in accordance with the present invention by continually correlating the stored known reference symbol sequence with the known block of reference symbols in the received samples over a symbol sample span covering the time dispersion uncertainty. For this purpose, correlator detector 35 may include a plurality of the correlator stages described above with reference to FIG. 3 but connected so as to provide an iteration of symbol time offsets for adjacent stages.

Figure 5:
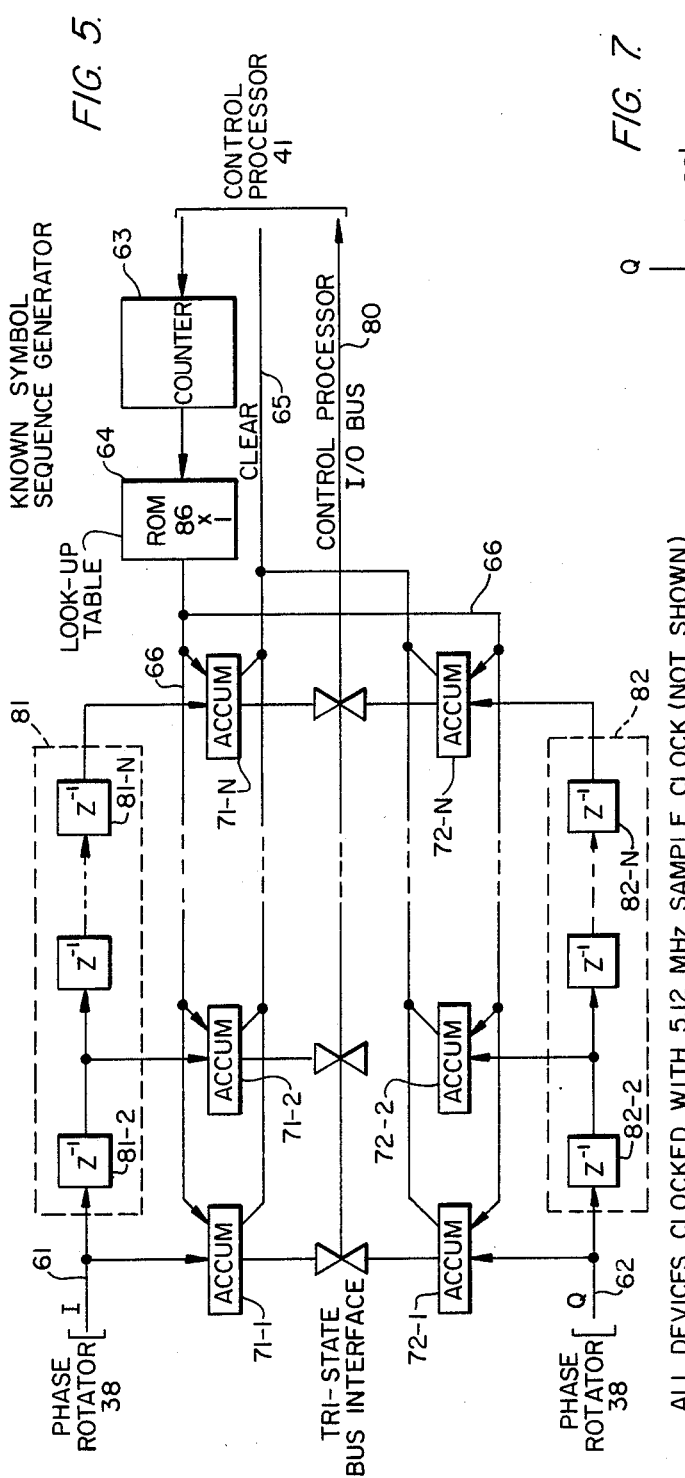
FIG. 5 is a schematic stock diagram of an iterated arrangement of time delayed correlation/detector stages of FIG. 3.

A block diagram of such a configuration is shown in FIG. 5 as comprising respective I and Q channel shift registers 81 and 82 containing a plurality (N=21) stages 81-2 ... 81-N and 82-2 ... 82-N, respectively. I and Q channel input links 61 and 62 are coupled to accumulators 71-1 and 72-1 and the first stage 81-2 and 82-2 of the respective registers, as shown. From stages 81-2 ... 82-N and 82-2 ... 82-N successive single sample time delayed versions of the I and Q channel sample values are coupled to correlator accumulators 71-2 ... 71-N and 72-2 ... 72-N, wherein the successively delayed samples are correlated with the stored replica of the known sample sequence accessed from ROM 64 under control of processor 41, as described above in conjunction with the description of FIGS. 3 and 4. Processor 41 monitors the location of the correlation energy and, in response to a time displacement of the energy, adjusts sample clock 33 via a control signal on line 52.

This monitoring of the correlation energy over the ten symbol span smearing uncertainty of interest may be carried out by measuring the level of the outputs of the end accumulators (i.e. the first and twenty-second) 71-1, 71-N and 72-1, and 72-N. If the correlation energy is properly centered or falls within the ten symbol span of interest, the outputs of the end accumulators, at opposite ends of the 22 symbol span, should be substantially the same. For a drift or offset of the correlation energy towards one or the other end of the span, corresponding to a need for sample data clock adjustment, a noticeable difference between the value contents of the end accumulates will occur. This difference is then used to generate a control code on line 52 for adjusting sample clock 33, to maintain a bit sync condition; i.e. the sample clock is advanced or retarded by the control code on link 52 so as to counter the above-mentioned correlation offset and thereby maintain the stored reference symbol sequence aligned with the received reference symbol sequence portion of each frame. This operation continues during the subsequent normal operation of the receiver so as to maintain synchronization.

FREQUENCY LOCK

Coarse Frequency Adjustment

As described briefly above, pursuant to the present invention, the signal acquisition and synchronization sequence employed is carried out in an order reverse to that of conventional schemes. Here, with frame sync and bit sync having been accomplished, the third task is to adjust the output of local oscillator 44 to refine the tuning of the receiver to the incoming IF signal.

Figure 6:
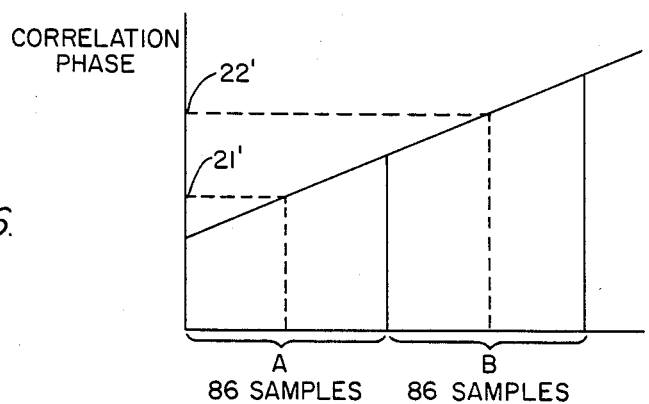
FIG. 6 illustrates the variation in average phase of the complex correlation over a known reference symbol block for an offset in frequency between receiver and transmitter.
Figure 7:
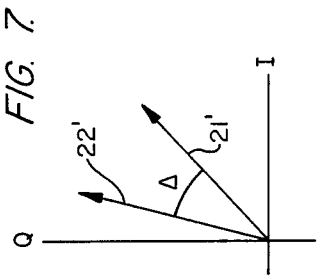
FIGS. 7 and 8 are vector diagrams associated with the phase change diagram of FIG. 6.
Figure 8:
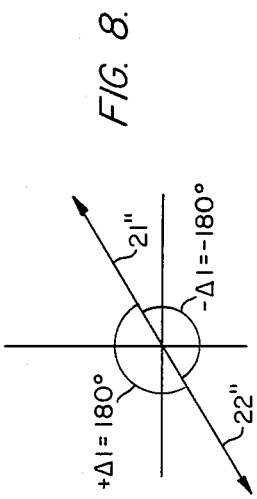

More particularly, a difference in the output frequency of numerically controlled oscillator 44 in the receiver from that of the local oscillator on the transmitter will be reflected as a variation in the phase of the complex correlation over separate portions of a symbol sample span of interest. This is illustrated in FIG. 6 as a ramp C. As shown in FIG. 6, over the first half A of the reference sequence symbol sample span (i.e. samples 1–86) the average phase of the complex correlation has some value 21, whereas over the second half of the sample span (samples 87–172) the average phase of the complex correlation has a different value 22. The complex values of these two successive 86 sample correlations may be represented as vectors 21' and 22', respectively, as shown in FIG. 7. The difference between these two values represents the offset and is employed by processor 41 to generate a control code on link 51 to adjust numerically controlled oscillator 44 to within 500 Hz of the transmitter's oscillator through successive iterations over several frames. In terms of the present exemplary embodiment the separation $\Delta$ between vectors 21' and 22' would be exactly 180° for a frequency difference of 29.77 KHz between transmitter and receiver. Namely, as shown in FIG. 8, vector 22" would be offset from vector 21" by $+\Delta_1$ or $-\Delta_2$ where $|\Delta_1| = |\Delta_2|$. Therefore, processor 41 does not know in which direction (+ or −) to adjust the output of oscillator 44.

For this reason, the maximum frequency offset which can be resolved using this initial coarse adjustment is ±29.77 KHz. To maintain sufficient sensitivity in the initial location of the known symbol sequence using the correlation detector, the spacing of the frequency bins scanned should be significantly less than this value, typically by at least half; a 10 KHz frequency bin spacing is preferably used for this particular embodiment of the invention. This spacing therefore ensures that the frequency offset prior to this coarse frequency adjustment is well within the limits of unambiguous resolution.

FINE FREQUENCY ADJUSTMENT

The fine frequency adjustment is conducted subsequent to the coarse frequency adjustment described above. It is substantially identical to the coarse adjustment except that it is carried out once per block of known reference symbol samples as opposed to twice per block of these samples. The comparison is made between adjacent blocks because of the fact that the phase offset for such adjustment blocks is within 180° so that both magnitude and direction of the offset can be determined. Here, the comparison of the average phase of the complex correlation values for successive blocks is used to produce a vernier or fine frequency adjustment of numerically controlled oscillator 44 to match that of the transmitter.

Given the degree of offset produced, for changes in frequency, further refinements (here over several reference blocks) may be produced using the above procedure, as desired. This fine adjustment is then continued as the frequency tracking loop during the subsequent normal (data mode) operation of the receiver. Again the measurement interval is limited to the extent that, for the frequency offset permitted, the phase offset is confined to less than 180° so that both magnitude and direction of change may be detected by processor 41 to enable the generator of the necessary control voltages on link 51 for oscillator 44. Thus, for this embodiment unambiguous resolution of initial offsets of less than ±500 Hz can be made.

As will be appreciated from the foregoing description, the signal acquisition and timing and synchronization scheme according to the present invention offers a significant advantage over conventional approaches by making effective use of signal sequences that are periodically interleaved with the unknown data being received for dynamically adjusting the modem's equalizer. Even in the case of severe distortion, doppler fades and loss of signal, the system of the present invention is able to rapidly reacquire and resynchronize itself to the transmitted signal without the need for a synchronization preamble. In this regard, it should be observed that the periodically inserted signal sequence is not limited to a particular insertion format. Thus, for example, several different sequences, occurring in successive frames may be employed, as long as the total grouping is periodically repeated or some long PN code with a coarse external time sync is used. Here the resolution of the frame scan must be at least equal to the coarse time uncertainty in the external timing reference. In this case the correlation detector has an a prior knowledge of the sequence group and employs a replica of each for the operation described above.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use in a communications receiver wherein signals received thereby contain successive data symbols between which are interleaved sequences of prescribed known symbols, the distribution of said interleaved sequences of prescribed known symbols among said data symbols being predetermined, said known symbols being employed in said receiver for providing compensation for distortion-introduced characteristics of a channel over which signals received have been transmitted, a method of operating said receiver to enable said receiver to detect said data symbols comprising the steps of:
   (a) selectively combining a replica of said known symbols with received symbol-representative signals so as to identify where, within the received signals, said sequences of prescribed known symbols whose distribution among said data symbols is predetermined are interleaved; and
   (b) causing the distortion-introducing characteristics of the channel to be compensated in accordance with the contents of received signals including those whose locations within the received signals correspond to those of the interleaved prescribed known symbols indentified in step (a).

2. A method according to claim 1, wherein signals received at said receiver are sampled at a rate effectively corresponding to the data rate of the transmitted symbols and further including the steps of
   (c) carrying out step (a) over a prescribed symbol span covering a time interval associated with the distortion introducing characteristics of said channel; and
   (d) controlling the rate at which signals received at said receiver are sampled in accordance with step (c).

3. A method according to claim 1, wherein step (a) comprises correlating said replica of said known symbols with said received symbol-representative signals so as to locate said successive sequences of interleaved known symbols among the received signals.

4. A method according to claim 3, wherein signals received at said receiver are sampled at a rate effectively corresponding to the data rate of the transmitted symbols and further including the steps of
   (c) carrying out step (a) over a prescribed symbol span covering a time interval associated with the distortion introducing characteristics of said channel; and
   (d) controlling the rate at which signals received at said receiver are sampled in accordance with step (c).

5. A method according to claim 4, wherein step (d) comprises controlling the rate at which signals received at said receiver are sampled so as to maintain correlation energy obtained from step (a) within a prescribed portion of said prescribed symbol span.

6. A method according to claim 2, wherein incoming signals at said receiver are combined with a local frequency signal generated in said receiver to produce down-converted signals containing sequences of data and known symbols, and said method further includes the step of
   (e) controlling the frequency of said local frequency signal in accordance with step (a).

7. A method according to claim 3, wherein incoming signals at said receiver are combined with a local frequency signal generated in said receive to produce down-converted signals containing sequences of data and known symbols and said method further includes the step of
   (e) controlling the frequency of said local frequency signal in accordance with the difference in correlation values for successive symbol intervals over which the correlation in step (a) is respectively carried out.

8. A method according to claim 7, wherein step (e) comprises the steps of
   (e1) controlling the frequency of said local frequency signal in accordance with the difference in correlation values derived over a first portion of the symbol span of said sequence of known symbols and over a second portion of the symbol span of said sequence of known symbols over which the correlation in step (a) is respectively carried out; and
   (e2) controlling the frequency of said local frequency signal in accordance with the difference in correlation values derived for a received one of said interleaved sequences of known symbols and a subsequently received interleaved sequence of known symbols for which the correlation in step (a) is respectively carried out.

9. A method according to claim 1, wherein step (a) comprises
   (a1) correlating said replica of said known symbols with a prescribed portion of a sequence of received symbol-representative signals the length of which prescribed portion corresponds to the number of data symbols immediately prior and subsequent to a sequence of interleaved known symbols plus the number of symbols in said sequence of known symbols,
   (a2) generating a signal representative of the correlation energy resulting from step (a1), and
   (a3) identifying the location of said sequence of known symbols within said sequence of received symbol representative signals as occurring at said prescribed position thereof in response to the signal generated in step (a2) exceeding a prescribed level.

10. A method according to claim 9, wherein step (a) further comprises the step of
  (a4) repeating steps (a1)–(a3) for successive portions of said sequence of received symbol-representative signals until step (a3) identifies the location of said sequence of known-symbols.

11. A method according to claim 10, wherein said sequence of known symbols is a PN symbol sequence.

12. A method according to claim 9, wherein signals received at said receiver are sampled at a rate effectively corresponding to the data rate of the transmitted symbols and further including the steps of
  (c) carrying out step (a) over a prescribed symbol span covering a time interval associated with the distortion introducing characteristics of said channel; and
  (d) controlling the rate at which signals received at said receiver are sampled in accordance with step (c).

13. A method according to claim 12, wherein step (d) comprises controlling the rate at which signals received at said receiver are sampled so as to maintain correlation energy obtained from step (a) within a prescribed portion of said prescribed symbol span.

14. For use in a communications receiver wherein signals received thereby contain successive data symbols between which are interleaved sequences of prescribed known symbols, the distribution of said interleaved sequences of prescribed known symbols among said data symbols being predetermined, said known symbols being employed in said receiver for providing compensation for distortion-introduction characteristics of a channel over which signals received have been transmitted, a signal processing apparatus for enabling said receiver to detect said data symbols comprising, in combination,
  first means for selectively combining a replica of said known symbols with received symbol-representative signals so as to identify where, within the received signals, said sequences of prescribed known symbols whose distribution among said data symbols is predetermined are interleaved; and
  second means, coupled to said first means for, causing the distortion-introducing characteristics of the channel to be compensated in accordance with the contents of received signals including those whose locations within the received signals corresponds to those of the interleaved prescribed known symbols identified by said first means.

15. A signal processing apparatus according to claim 14, wherein signals received at said receiver are sampled at a rate effectively corresponding to the data rate of the transmitted symbols and wherein said first means includes
  means for selectively combining said replica of said known symbols with said receiver symbol-representative signals over a prescribed symbol-span covering a time interval associated with the distortion-introducing characteristics of said channel; and
  means for controlling the rate at which signals received at said receiver are sampled in accordance with the selective combining operation of said first means over said prescribed symbol span.

16. A signal processing apparatus according to claim 14, wherein said first means includes means for correlating said replica of said known symbols with said received symbol-representative signals so as to locate said successive sequences of interleaved known symbols among the received signals.

17. A signal processing apparatus according to claim 16, wherein signals received at said receiver are sampled at a rate effectively related to the data rate of the transmitted symbols and wherein said first means includes
  means for correlating said replica of said known signals with said received symbol representative signals over a prescribed symbol span covering a time interval associated with the distortion-introducing characteristics of said channel; and
  means for controlling the rate at which signals received at said receiver are sampled in accordance with the correlation operation of said first means over said prescribed symbol span.

18. A signal processing apparatus according to claim 17, wherein said controlling means comprises means for controlling the rate at which signals received at said receiver are sampled so as to maintain correlation energy within a prescribed portion of said prescribed symbol span.

19. A signal processing apparatus according to claim 15, wherein incoming signals at said receiver are combined with the output of a local frequency signal generator in said receiver to produce down-converted signals containing sequences of data and known symbols, and said signal processing apparatus further includes means for controlling the frequency of said local frequency signal in accordance with the output of said first means.

20. A signal processing apparatus according to claim 16, wherein incoming signals at said receiver are combined with the output of a local frequency signal generator to produce down-converted signals containing sequences of data and known symbols and said apparatus further includes means for controlling the frequency of said local frequency signal in accordance with the difference in correlation values for successive symbol intervals over which correlations are respectively carried out by said first means.

21. A signal processing apparatus according to claim 20, wherein said controlling means comprises means for controlling the frequency of said local frequency signal generator in accordance with the difference in correlation values derived over a first portion of the symbol span of said sequence of known symbols and over a second portion of the symbol span of said sequence of known symbols over which the correlations are respectively carried out by said first means, and for controlling the frequency of said local frequency signal in accordance with the difference in correlation values derived for a received one of said interleaved sequences of known symbols and a subsequently received interleaved sequence of known symbols for which the correlations are respectively carried out by said first means.

22. A signal processing apparatus according to claim 14, wherein said first means comprises
  means for correlating said replica of said known symbols with a prescribed portion of a sequence of received symbol-representative signals the length of which prescribed portion corresponds to the number of data symbols immediately prior and subsequent to a sequence of interleaved known symbols plus the number of symbols in said sequence of known symbols, means for generating a signal representative of the correlation energy derived by said correlating means, and means for identifying the location of said sequence of known symbols within said sequences of received symbol representative signals as occurring at said prescribed position thereof in response to the signal generated by said signal generating means exceeding a prescribed level.

23. A signal processing apparatus according to claim 22, wherein said correlating means comprises means for repeating its correlation operation for successive portions of said sequence of received symbol-representative signals until said identifying means identifies the location of said sequence of known-symbols.

24. A signal processing apparatus according to claim 23, wherein said sequence of known symbols is a PN symbol sequence.

25. A signal processing apparatus according to claim 22, wherein said first means comprises means for correlating said replica of said known symbols with a prescribed portion of a sequence of received symbol-representative signals the length of which prescribed portion corresponds to the number of data symbols immediately prior and subsequent to a sequence of interleaved known symbols plus the number of symbols in said sequence of known symbols, means for generating a signal representative of the correlation energy derived by said correlating means, and means for identifying the location of said sequence of known symbols within said sequences of received symbol representative signals as occurring at said prescribed position thereof in response to the signal generated by said signal generating means exceeding a prescribed level.

26. A signal processing apparatus according to claim 25, wherein said controlling means comprises means for controlling the rate at which signals received at said receiver are sampled so as to maintain correlation energy within a prescribed portion of said prescribed symbol span.

27. A signal processing apparatus according to claim 16, wherein said second means comprises an adaptive equalizer the number of stages of which corresponds to said prescribed symbol span.

28. A signal processing apparatus according to claim 27, wherein said second means includes means for causing said adaptive equalizer to train up in accordance in the said contents of received signals whose locations within the received signals correspond to those of the interleaved prescribed known symbols identified by said first means upon said first means identifying said location.

29. For use in a communications system wherein signals transmitted over a communication channel are formatted as successive frames of symbols, each frame containing a block of a first prescribed member of unknown information symbols to be recovered and a block of a second prescribed number of known reference symbols, so that for successive frames of symbols the blocks of unknow information symbols are interleaved with blocks of known reference symbols, the distribution of said interleaved blocks of known reference symbols among said blocks of unknown information symbols being predetermined, said known symbols being employed at a receiver for providing compensation for distortion-introducing characteristics of a channel over which received signals have been transmitted, a method of operating said receiver to enable said receiver to recover said unknown information symbols comprising the steps of:

(a) correlating a sequentially generated replica of said block of known symbols with sequences of received symbol-representative signals, each sequence covering the span of a frame of symbols, and causing said replica of said block of known symbols to be generated in synchronism with the blocks of known symbols contained in the received signals, whose distribution among said blocks of unknown information symbols is predetermined, in accordance with the correlation of said generated replica with said sequences of received symbol-representative signals; and (b) causing the distortion-introducing characteristics of the channel to be compensated in accordance with the contents of the received signals corresponding to the known blocks of symbols in successive frames of symbols.

30. A method according to claim 29, wherein signals received at said receiver are sampled at a rate effectively related to the data rate of the transmitted symbols and further including the steps of (c) carrying out step (a) over a prescribed symbol span covering a time interval associated with the distortion introducing characteristics of said channel; and (d) controlling the rate at which signals received at said receiver are sampled in accordance with step (c).

31. A method according to claim 30, wherein step (d) comprises controlling the rate at which signals received at said receiver are sampled so as to maintain correlation energy obtained from step (a) within a prescribed portion of said prescribed symbol span.

32. A method according to claim 31, wherein incoming signals at said receiver are combined with a local frequency signal generated in said receiver to produce down-converted signals containing said frames of unknown information symbols and known information symbols, and said method further includes the step of (e) controlling the frequency of said local frequency signal in accordance with step (a).

33. A method according to claim 32, wherein each block of known symbols comprises a PN symbol sequence.

34. For use in a communications system wherein signals transmitted over a communication channel are formatted as successive frames of symbols, each frame containing a block of a first prescribed number of unknown information symbols to be recovered and a block of a second prescribed number of known reference symbols, so that for successive frames of symbols the blocks of unknown information symbols are interleaved with blocks of knwon reference symbols, the distribution of said interleaved blocks of known reference symbols among said blocks of unknown information symbols being predetermined, said known symbols being employed at a receiver for providing compensation for distortion-introducing characteristics of a channel over which received signals have been transmitted, a signal processing apparatus for enabling said received to recover said unknown information symbols comprising:

first means for correlating a sequentially generated replica of said block of known symbols with sequences of received symbol-representative signals, each seqeunce covering the span of a frame of symbols, and causing said replica of said block of known symbols to be generated in synchronism with the blocks of known symbols contained in the received signals, whose distribution among said blocks of unknown information symbols is predetermined, in accordance with the correlation of said generated replica with said sequences of received symbol-representative signals; and second means, coupled to said for means, for causing the distortion-introducing characteristics of the channel to be compensated in accordance with the contents of the received signals corresponding to the known blocks of symbols in successive frames of symbols.

35. A signal processing apparatus according to claim 34, wherein signals received at said receiver are sampled at a rate effectively related to the data rate of the transmitted symbols and wherein said first means includes means for selectively combining said replica of said known symbols with said receiver symbol-representative signals over a prescribed symbol span covering a time interval associated with the distortion-introducing characteristics of said channel; and means for controlling the rate at which signals received at said receiver are sampled in accordance with the selective combining operation of said first means over said prescribed symbol span.

36. A signal processing apparatus according to claim 35, wherein said controlling means comprises means for controlling the rate at which signals received at said receiver are sampled so as to maintain correlation energy within a prescribed portion of said prescribed symbol span.

37. A signal processing apparatus according to claim 36, wherein incoming signals at said receiver are combined with a local frequency signal generated in said receiver to produce down-converted signals containing said frames of unknown information symbols and known information symbols, and said signal processing apparatus further means for controlling the frequency of said local frequency signal in accordance with the output of said first means.

38. A signal processing apparatus according to claim 37, wherein each block of known symbols comprises a PN symbol sequence.

39. For use in a communications receiver wherein signals received thereby contain successive data symbols between which are interleaved sequences of prescribed known symbols, the distribution of said interleaved sequences of prescribed known symbols among said data symbols being predetermined, said known symbols being employed in said receiver for providing compensation for distortion-introduced characteristics of a channel over which signals received have been transmitted, a method of operating said receiver to enable said receiver to detect said data symbols comprising the steps of:

(a) selectively combining a replica of said known symbols with received symbol-representative signals until the timing of the occurence of said interleaved sequences of prescribed known symbols in said received signals has been identified;

(b) adjusting the timing at which said replica of said known symbols is generated in order to maintain a prescribed time alignment between said replica of said known symbols and a received known symbol sequence;

(c) generating a frequency for tuning the receiver to a modulation frequency for said symbols and adjusting said frequency; and (d) causing the distortion-introducing characteristics of the channel to be compensated in accordance with the contents of received signals including those the timing of occurence of which within the received signals corresponds to that of the interleaved prescribed known symbols identified in step (a).

40. A method according to claim 39, wherein signals received at said receiver are sampled at a rate effectively corresponding to the data rate of the transmitted symbols and wherein step (a) is carried out over a prescribed symbol span and step (b) comprises controlling the rate at which signals received at said receiver are sampled.

41. A method according to claim 39, wherein step (a) comprises correlating said replica of said known symbols with said received symbol-representative signals so as to locate said successive sequences of interleaved known symbols among the received signals.

42. A method according to claim 41, wherein signals received at said receiver are sampled at a rate effectively corresponding to the data rate of the transmitted symbols and wherein step (a) is carried over a prescribed symbol span and step (b) includes controlling the rate at which signals received at said receiver are sampled.

43. A method according to claim 42, wherein step (b) comprises controlling the rate at which signals received at said receiver are sampled so as to maintain correlation energy obtained from step (a) within a prescribed portion of said prescribed symbol span.

44. A method according to claim 41, wherein step (c) comprises controlling the frequency of a local frequency signal corresponding to said modulation frequency in accordance with the difference in correlation values for successive symbol intervals over which the correlation in step (a) is respectively carried out.

45. A method according to claim 44, wherein step (c) comprises the steps of (c1) controlling the frequency of said local frequency signal in accordance with the difference in correlation values derived over a first portion of the symbol span of said sequence of known symbols and over a second portion of the symbol span of said sequence of known symbols over which the correlation in step (a) is respectively carried out; and (c2) controlling the frequency of said local frequency signal in accordance with the difference in correlation values derived for a received one of said interleaved sequences of known symbols and a subsequently received interleaved sequence of known symbols for which the correlation in step (a) is respectively carried out.

46. A method according to claim 39, wherein step (a) comprises (a1) correlating said replica of said known symbols with a prescribed portion of a sequence of received symbol-representative signals the length of which prescribed portion corresponds to the number of data symbols immediately prior and subsequent to a sequence of interleaved known symbols plus the number of symbols in said sequence of known symbols, (a2) generating a signal representative of the correlation energy resulting from step (a1), and (a3) identifying the location of said sequence of known symbols within said sequence of received symbol representative signals as occurring at said prescribed position thereof in response to the signal generated in step (a2) exceeding a prescribed level.

47. A method according to claim 46, wherein step (a) further comprises the step of (a4) repeating steps (a1)–(a3) for successive portions of said sequence of received symbol-representative signals until step (a3) identifies the location of said sequence of known-symbols.

48. A method according to claim 47, wherein said sequence of knwon symbols is a PN symbol sequence.

49. For use in a communications receiver wherein signals received thereby contain successive data symbols between which are interleaved sequences of prescribed known symbols, the distribution of said interleaved sequences of prescribed known symbols among said data symbols being predetermined, said known symbols being employed in said receiver for providing compensation for distortion-introducing characteristics of a channel over which signals received have been transmitted, a signal processing apparatus for enabling said receiver to detect said data symbols comprising, in combination;

first means for combining a replica of said known symbols with received symbol-representative signals until the timing of the occurence of said interleaved sequences of prescribed known symbols in said received signal has been identified;

second means, responsive to the operation of said first means, for adjusting the timing at which said replica of said known symbols is generated in order to maintain a prescribed time alignment between said replica of said known symbols and a received known symbol sequence;

third means, responsive to the operation of said first and second means means, for generating a frequency for tuning the receiver to a modulation frequency for said symbols and adjust said frequency; and fourth means for causing the distortion-introducing characteristics of the channel to be compensated in accordance with the contents of received signals including those the timing of occurence of which within the received signals corresponds to that of the interleaved prescribed known symbols identified by said first means.

50. A signal processing apparatus according to claim 49, wherein signals received at said receiver are sampled in accordance with the operation of said second means at a rate effectively corresponding to the data rate of the transmitted symbols and wherein said first means includes means for selectively combining said replica of said known symbols with said receiver symbol-representative signals over a prescribed symbol-span; and said second means includes means for controlling the rate at which signals received at said receiver are sampled in accordance with the selective combining operation of said first means over said prescribed symbol span.

51. A signal processing apparatus according to claim 49, wherein said first means includes means for correlating said replica of said known symbols with said received symbol-representative signals so as to locate said successive sequences of interleaved known symbols among the received signals.

52. A signal processing apparatus according to claim 51, wherein signals received at said receiver are sampled in accordance with the operation of said second means at a rate effectively related to the data rate of the transmitted symbols and wherein said first means includes means for correlating said replica of said known signals with said received symbol representative signals over a prescribed symbol span; and said second means includes means for controlling the rate at which signals received at said receiver are sampled in accordance with the correlation operation of said first means over said prescribed symbol span.

53. A signal processing apparatus according to claim 52, wherein said controlling means comprises means for controlling the rate at which signals received at said receiver are sampled so as to maintain correlation energy within a prescribed portion of said prescribed symbol span.

54. A signal processing apparatus according to claim 51 wherein said third means includes means for controlling the frequency of a local frequency signal corresponding to said modulation frequency in accordance with the difference in correlation values for successive symbol intervals over which correlations are respectively carried out by said first means.

55. A signal processing apparatus according to claim 54, wherein said controlling means comprises means for controlling the frequency of said local frequency signal generator in accordance with the difference in correlation values derived over a first portion of the symbol span of said sequence of known symbols and over a second portion of the symbol span of said sequence of known symbols over which the correlations are respectively carried out by said first means, and for controlling the frequency of said local frequency signal in accordance with the difference in correlation values derived for a received one of said interleaved sequences of known symbols and a subsequently received interleaved sequence of known symbols for which the correlations are respectively carried out by said first means.

56. A signal processing apparatus according to claim 49, wherein said first means comprises means for correlating said replica of said known symbols with a prescribed portion of a sequence of received symbol-representative signals the length of which prescribed portion corresponds to the number of data symbols immediately prior and subsequent to a sequence of interleaved known symbols plus the number of symbols in said sequence of known symbols, means for generating a signal representative of the correlation energy derived by said correlating means, and means for identifying the location of said sequence of known symbols within said sequences of received symbol representative signals as occurring at said prescribed position thereof in response to the signal generated by said signal generating means exceeding a prescribed level.

57. A signal processing apparatus according to claim 56, wherein said correlating means comprises means for repeating its correlation operation for successive portions of said sequence of received symbol-representative signals until said identifying means identifies the location of said sequence of known-symbols.

58. A signal processing apparatus according to claim 57, wherein said sequence of known symbols is a PN symbol sequence.

* * * * *